June 5, 1962  J. HARDY  3,037,314
FISHING ROD HOLDER
Filed April 24, 1961  2 Sheets-Sheet 2
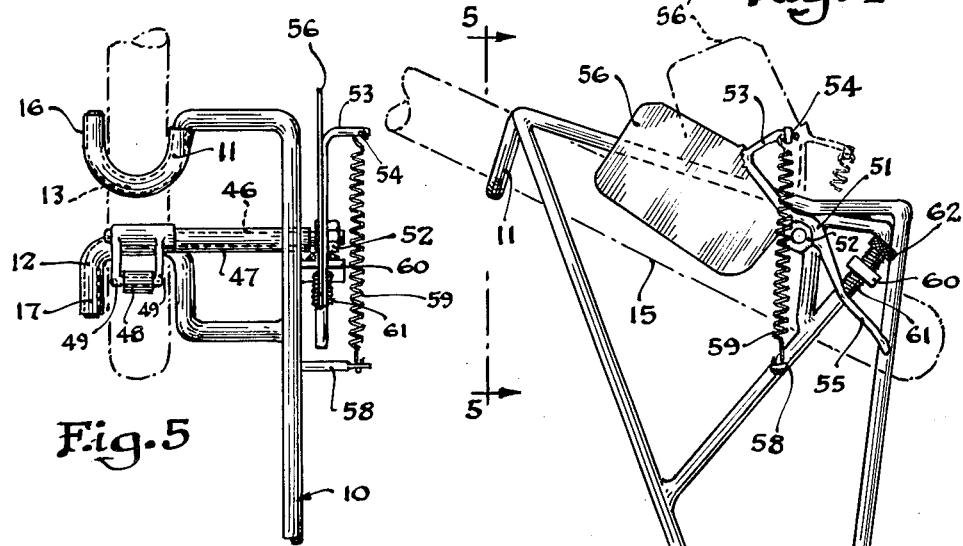
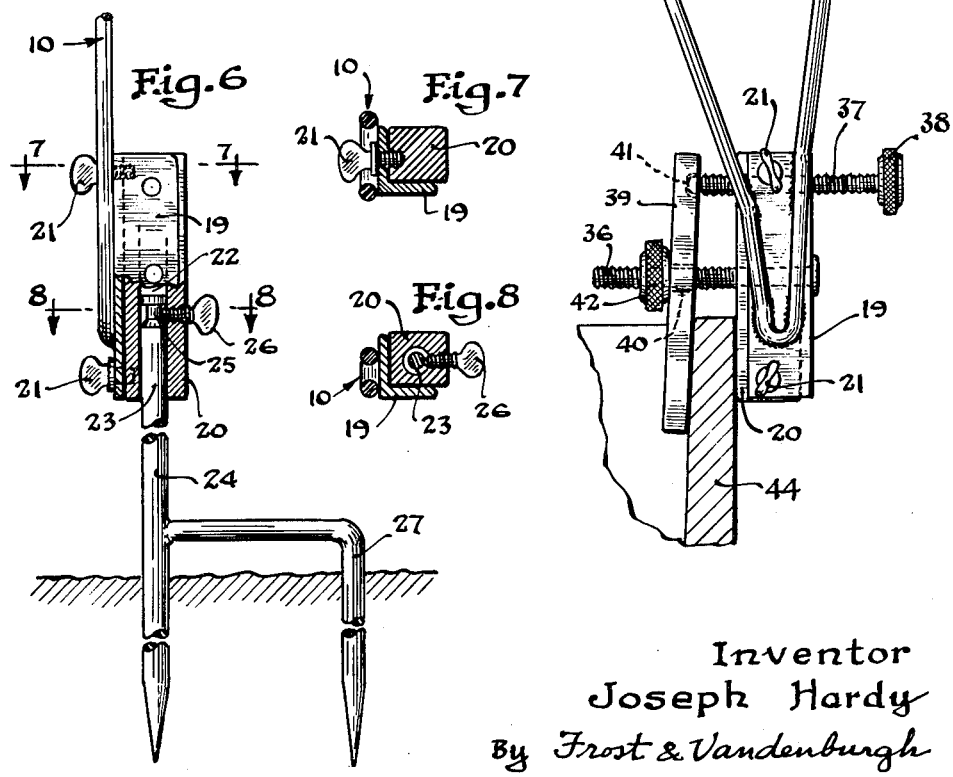
Inventor
Joseph Hardy
By Frost & Vandenburgh
Attorneys

United States Patent Office 3,037,314
Patented June 5, 1962

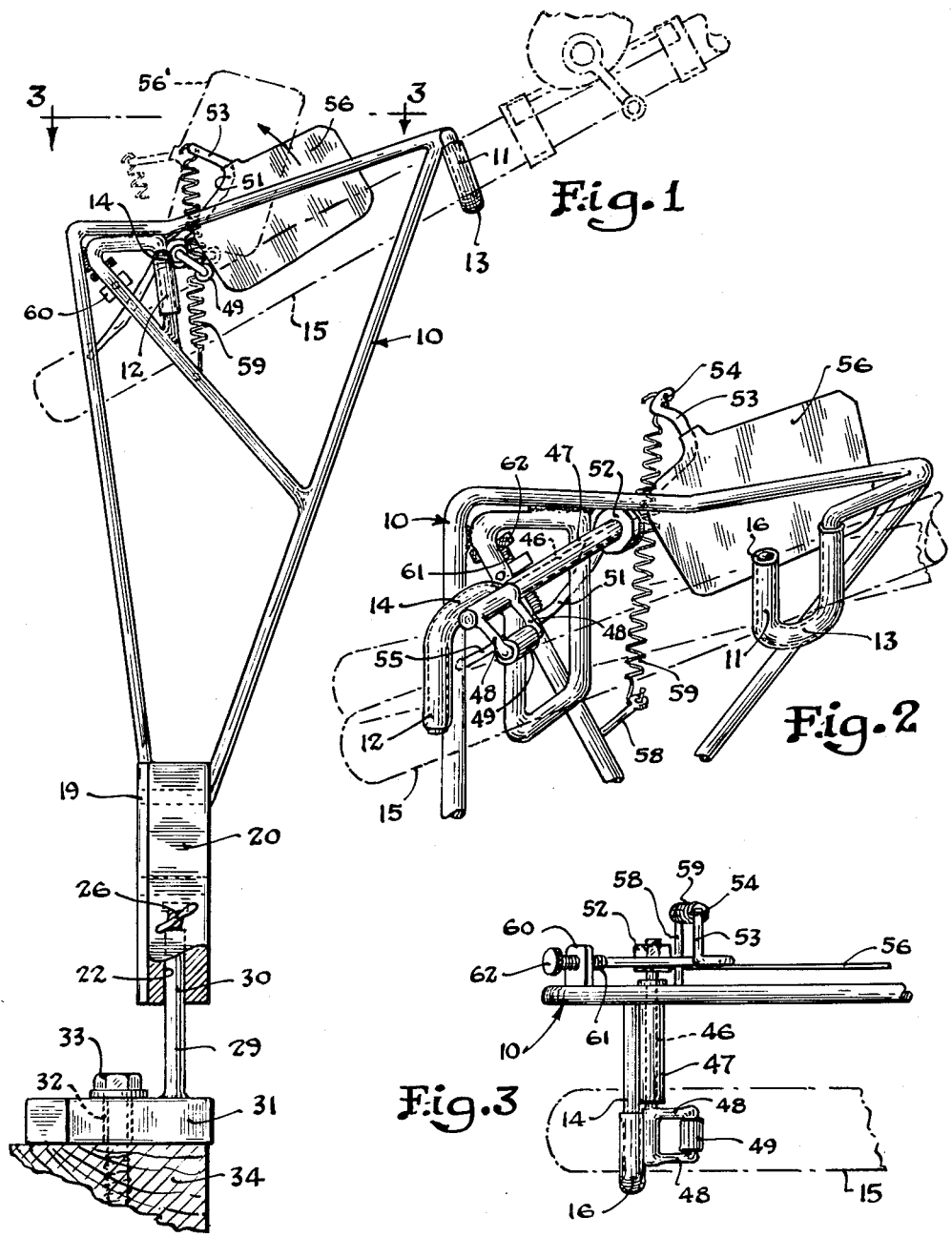

3,037,314
FISHING ROD HOLDER
Joseph Hardy, 6815 S. Langley Ave., Chicago, Ill.
Filed Apr. 24, 1961, Ser. No. 105,129
6 Claims. (Cl. 43—17)

The present invention relates to a fishing rod holder having a signaling means to indicate a pull on the pole, such as might be caused by a fish tugging on the fishing line.

In the past there have been various proposals for fishing rod holders, many of which include devices for providing a signal that there has been a pull on the fishing line. The present invention provides a novel device of this general type, but which has numerous advantages over the prior art suggestions. It is sturdy and reliable. It may be used with fishing outfits having any type of reel, or in fact no reel at all. In contradistinction, many of the prior art devices required a reel of a particular type, size and shape for the device to operate for its intended purpose. It is reliable in operation. The actual moving parts are few and are of such a character that there is little opportunity for them not to be in proper working condition. It is of universal applicability since it can be used equally well on a pier, a boat or on the water bank.

The universal mounting features are such that a ground stake easily and quickly may be inserted into the water bank, or just as easily and quickly the apparatus may be attached to a side or transom of a boat. If desired, the mounting can swivel so that the pole will follow the pulls and tugs of a fish caught on the end of the line.

Perhaps one of the most important features of my invention is that it may be easily adjusted by the user to require any desired degree of pull on the end of the pole before it will signal that a pull has occurred. Thus when fishing with a given type of equipment and under specific conditions for one type of fish, a fisherman would not want to be called to attend to the fishing equipment until there had been a relatively strong pull on the line, while under other conditions, using other equipment, etc., the fisherman would want to be notified of a relatively light pull on the line. This is easily accomplished by the fisherman using an embodiment of my invention.

Another advantage of my invention over various of the prior art devices is that once a pull has occurred that fact will be signaled until the apparatus is reset. Thus if the fisherman is not in the vicinity of the fishing apparatus and, as a consequence, would not be aware of a momentary signal resulting from a momentary pull on the line, he would not know that such a pull had occurred when he returned to the vicinity of the fishing apparatus. Using an embodiment of my invention, that fisherman would be aware immediately upon his return that a pull on the line had occurred during his absence.

A further advantage of my invention is that a strong, sturdy apparatus incorporating the foregoing features can be produced at a relatively nominal cost. The parts may be formed with a minimum of common metalworking operations.

Further objects and advantages will become apparent from the following description taken in conjunction with the drawings, in which:

FIGURE 1 is a side elevation of an embodiment as it might appear mounted on a pier;

FIGURE 2 is a perspective view of the upper portion illustrating the signaling apparatus;

FIGURE 3 is a plan view of a portion only of the apparatus;

FIGURE 4 is an elevation at the opposite side of FIGURE 1 and illustrating the mounting of the invention on the side of a boat for example;

FIGURE 5 is a partial elevation as viewed at line 5—5 of FIGURE 4;

FIGURE 6 is a partial elevation of the bottom of the holder illustrating an alternative mounting in the ground;

FIGURE 7 is a section taken at line 7—7 of FIGURE 6; and

FIGURE 8 is a section taken at line 8—8 of FIGURE 6.

The invention comprises a frame generally 10. In the illustrated embodiment, the frame is formed of steel rods bent and welded. The interrelated triangular conformation into which these rods are formed provides strength with a minimum weight. At the same time, the structure of the frame is such that the device is not expensive to manufacture. Adjacent the top thereof, the frame defines a pair of rod holders 11 and 12. As best seen in FIGURES 2 and 5, the holders 11 and 12 are hooked, or of a generally U shaped configuration, whereby the holder 11 defines a bottom rod support portion 13 and the holder 12 defines a top rod support portion 14. The sides of the holders opposite the rod support portions are open to facilitate the insertion to and removal of the fishing rod 15 from the position illustrated in FIGURES 1 and 4. Holders 11 and 12 may be formed of the same steel rod from which the main portion of frame 10 was formed. To protect the pole, rubber sleeves 16 and 17 are slipped over holders 11 and 12, respectively. (See FIGURE 5.)

At the bottom, the rod portions of frame 10 are welded to a steel or iron angle 19. Angle 19, in turn, is attached to an aluminum block 20 by means of thumb screws 21, which extend through openings in angle 19 and are threaded into tapped holes in block 20. A bore 22 extends vertically upward from the bottom of block 20.

Referring to FIGURE 6, the shank 23 of a ground stake 24 may be received in bore 22. Shank 23 has a groove 25 about its periphery adjacent the top thereof. A thumb screw 26 extends through a tapped opening in block 20 and projects into groove 25. Thus thumb screw 26 locks ground stake 24 to block 20, and unless the thumb screw 26 is tightened down to serve as a set screw, block 20 will rotate freely about the shank 23 of ground stake 24. An offset stake 27 is formed unitary with ground stake 24 to stabilize the position of ground stake 24 when the two are inserted into the ground as illustrated in FIGURE 6. Furthermore, the top of the offset stake serves as a step to enable the user to push the ground stake 24 and offset stake 27 into the ground with his foot.

For mounting on a pier or the like, a support rod 29 having a shank 30 corresponding to shank 23 is employed, as illustrated in FIGURE 1. Rod 29 is affixed to a mounting member 31 having an opening 32 therethrough. Means such as lag bolt 33 may be extended through opening 32 to affix the mounting member 31 to a plank 34 or the like.

For mounting on the side of a boat or the like, a bolt 36 is threaded through angle 19 and block 20. A clamping screw 37 having a knurled head 38 likewise is threaded through angle 19 and block 20. A clamping plate 39 has an opening 40 through which bolt 36 extends. Opening 40 is somewhat larger in diameter than is the external diameter of bolt 36. Plate 39 also has a recess 41 into which projects the end of clamping screw 37. A knurled nut 42 is threaded onto bolt 36. Plate 39 is formed of aluminum. Thus when the apparatus is mounted on the side of an aluminum boat, only aluminum plate 39 and aluminum block 20 are in contact with the aluminum of the boat.

To mount the apparatus on a vertical member 44, such as the side of a boat or the like, nut 42 is loosened until the member 44 will easily slip between plate 39 and block 20. Thereafter, nut 42 is tightened until plate 39 and block 20 fit snugly on opposite sides of the member 44. Thereafter, clamping screw 37 is rotated in the direction such that the outstanding end thereof presses into recess 41 in plate 39. Continued rotation of clamping screw 37 in the same direction will push the upper end of plate 39 away from block 20 and cause the lower end of plate 39 to firmly squeeze member 44 between plate 39 and block 20.

A shaft 46 extends in immediate juxtaposition to the top rod support portion 14 of rod holder 12. The shaft is aligned so that it is generally normal to the length of pole 15 when the pole is in the holders 11 and 12. Shaft 46 is journaled in a bearing 47 affixed to frame 10. On the holder end of shaft 46 is a lever means formed by a pair of arms 48 and a roller 49. Roller 49 is rotatably mounted on the outstanding ends of arms 48. The other ends of arms 48 are affixed to shaft 46.

The opposite end of shaft 46 is threaded and a loop in the central portion of a rod 51 is affixed to the shaft by means of a nut 52. The upper end of rod 51 forms a hook 53 having an eye 54 on the end thereof. The lower end of rod 51 forms a lever 55. A flag 56 is mounted on the upper end of rod 51. A pin 58 having an eye at the end thereof is affixed to and projects from frame 10. A spring 59 interconnects the eye on pin 58 and eye 54 on hook 53.

An arm 60 projects from frame 10 and has a threaded opening therethrough to receive adjusting screw 61. Adjusting screw 61 has a knurled head 62. The opposite end of screw 61 is positioned to contact lever 55 (as illustrated in FIGURE 4) in one position of the flag 56. Lever 55 also is sufficiently long that in the opposite position of flag 56 it will contact pin 58 on which spring 59 is mounted. A bell (not shown) could be positioned on frame 10 to be struck by lever 55 as the flag moves from the full line to the dotted line position.

Eye 54 on rod 51 and pin 58 are so positioned with respect to the axis of shaft 46 that spring 59 moves across center as flag 56 moves from one of its two alternative positions to the other. For example, referring to FIGURE 4, when flag 56 is moved from the full line position 56 to the dotted line position 56', spring 59 must necessarily be extended from the length that it assumes at either of the two alternative positions. Thus spring 59 normally will act to urge flag 56, shaft 46 and the related parts into one or the other of the two alternative positions. The extent to which spring 59 must be extended in moving across center will be determined by how close the spring is to the center position initially. This is controlled by adjusting screw 61. Again referring to FIGURE 4, it will be seen that spring 59 is quite close to its center position. If head 62 were rotated so as to retract adjusting screw 61 upwardly to the right, this would result in the upper end of spring 59 (eye 54) moving farther to the left away from center. In the latter position, a greater force would be required to move the flag 56 away from the full line position and to extend spring 59 in its travel across center.

In use the flag is initially positioned downwardly, as illustrated in full lines. A rod 15 then is hooked in the two holders 11 and 12. In this position of flag 56, roller 49 bears down on the top of the rod 15 adjacent the butt thereof, and adjacent holder 12. As best seen in FIGURE 2, this holds the top side of rod 15 away from the rod support portion 14 of holder 12. A downward pull on the tip (not shown) of the rod 15 acts to pivot rod 15 in holder 11 and to push upwardly on roller 49. If that force applies sufficient pressure on roller 49 to pivot shaft 46 against the over-the-center restraint supplied by spring 59, flag 56 will be tipped to its upwardly 56' position. Spring 59 thereafter will hold the flag in the 56' position until the apparatus is reset. If the downward pull on the tip of the pole was not sufficient to overcome the resistance supplied by the over-the-center restraint of spring 59, the flag 56 will remain down in its full line position. As previously explained, the amount of force required to overcome the restraint of spring 59 can be varied by adjustment of adjusting screw 61. This screw may be suitably calibrated to indicate the amount of force necessary to cause flag 56 to be raised for any given setting of the adjusting screw.

The foregoing description of a specific embodiment is for the purpose of complying with 35 U.S.C. 112 and should not be construed as imposing unnecessary limitations upon the appended claims inasmuch as modifications and variations thereof will be apparent to those skilled in the art.

I claim:

1. A fishing rod holder comprising: a frame; a pair of aligned and spaced rod holders mounted on said frame, the first of said holders having a top rod support and the other a bottom rod support, whereby the rod may be held in said holders with a first side of a first portion of the rod adjacent the butt thereof bearing against the top support and a second portion closer to the tip than the first portion bearing against the other support on the opposite side of the rod; and signaling means actuated by a downward pull on the tip of the rod comprising, a shaft journaled in said frame for pivotal movement between two positions, a lever means mounted on said shaft, and having a portion spaced from the shaft and, in a first position of said shaft, bearing on said rod adjacent one of said holders, said portion of said lever means bearing against the same side of the rod as bears against the support of said one holder when said shaft is in its second position, and in said first position of said shaft positioning said same side at a spaced distance from said support of said one holder, whereby a downward pull on the tip of said rod will urge said shaft toward the second position, means connecting the shaft and the frame to yieldingly resist movement of the shaft from the first to the second position, and a signaling device operatively associated with said shaft to signal the movement of the shaft from the first to the second position.

2. A fishing rod holder comprising: a frame; a pair of aligned and spaced rod holders mounted on said frame, the first of said holders having a top rod support and the other a bottom rod support, whereby the rod may be held in said holders with a first side of a first portion of the rod adjacent the butt thereof bearing against the top support and a second portion closer to the tip than the first portion bearing against the other support on the opposite side of the rod; and signaling means actuated by a downward pull on the tip of the rod comprising, a shaft journaled in said frame for pivotal movement between two positions, a lever means mounted on said shaft, and having a portion spaced from the shaft and, in a first position of said shaft, bearing on said rod adjacent one of said holders, said portion of said lever means bearing against the same side of the rod as bears against the support of said one holder when shaft is in its second position, and in said first position of said shaft positioning said same side at a spaced distance from said support of said one holder, whereby a downward pull on the tip of said rod will urge said shaft toward the second position, a second lever attached to said shaft, resilient means connecting said second lever and said frame at a given point on the frame, said point being so positioned with respect to said lever that said resilient means moves over-the-center when said shaft moves between said positions, and a flag attached to said shaft.

3. A holder for a fishing rod having a butt and a tip, said holder comprising: a frame; a pair of aligned and spaced rod holders mounted on said frame and each having an open side, the first of said holders having a top support and the other holder having a bottom support, whereby the rod may be held in said holders with the top side of the rod adjacent the butt bearing against said top support and the bottom of the rod at a point closer to the tip bearing against the other holder; and signaling means actuated by a downward pull on the tip of the rod comprising, a shaft journaled in said frame for pivotal movement between two positions, a lever means mounted on said shaft, and having a portion spaced from the shaft and, in a first position of said shaft, bearing on the top of said rod adjacent said first holder when said shaft is in the first position to hold the top of the rod spaced from the support of said first holder, said lever means being so positioned on said shaft so that an upward movement of said portion of said lever means moves said shaft from said first to the second position, whereby a downward pull on the tip of said rod will urge said shaft toward the second position, means connecting the shaft and the frame to yieldingly resist movement of the shaft from the first to the second position, and a signaling device operatively associated with said shaft to signal the movement of the shaft from the first to the second position.

4. A holder for a fishing rod having a butt and a tip, said holder comprising: a frame; a pair of aligned and spaced rod holders mounted on said frame and each having an open side, the first of said holders having a top support and the other holder having a bottom support, whereby the rod may be held in said holders with the top side of the rod adjacent the butt bearing against said top support and the bottom of the rod at a point closer to the top bearing against the other holder; and signaling means actuated by a downward pull on the tip of the rod comprising, a shaft journaled in said frame for pivotal movement between two positions, a lever means mounted on said shaft, a roller rotatably mounted on said lever means for rotation about an axis spaced from said shaft and generally normal to said rod, said roller being positioned to bear against the top of said rod adjacent said first holder when said shaft is in the first position to hold the top of the rod spaced from the support of said first holder, said lever means being so positioned on said shaft so that an upward movement of said roller moves said shaft from said first to the second position, whereby a downward pull on the tip of said rod will urge said shaft toward the second position, means connecting the shaft and the frame to yieldingly resist movement of the shaft from the first to the second position, and a signaling device operatively associated with said shaft to signal the movement of the shaft from the first to the second position.

5. A holder for a fishing rod having a butt and a tip, said holder comprising: a frame; a pair of aligned and spaced rod holders mounted on said frame and each having an open side, the first of said holders having a top support and the other holder having a bottom support, whereby the rod may be held in said holders with the top side of the rod adjacent the butt bearing against said top support and the bottom of the rod at a point closer to the top bearing against the other holder; and signaling means actuated by a downward pull on the tip of the rod comprising, a shaft journaled in said frame positioned in juxtaposition to said first holder and extending generally normal to and above said rod, a lever attached to said shaft, positioned above said rod and extending generally toward the other holder, said shaft being pivotal from a first position at which said lever extends downwardly toward said rod to a second position at which said lever is above its position when said shaft is in the first position, a roller rotatably mounted on said lever means for rotation about an axis spaced from said shaft and generally normal to said rod, said roller being positioned to bear against the top of said rod adjacent said first holder when said shaft is in the first position to hold the top of the rod spaced from the support of said first holder, whereby a downward pull on the tip of said rod will urge said shaft toward the second position, a second lever attached to said shaft, resilient means connecting said second lever and said frame at a given point on the frame, said point being so positioned with respect to said lever that said resilient means moves over-the-center when said shaft moves between said positions, and a flag attached to said shaft.

6. A signaling apparatus for use with a fishing rod holder having a pair of aligned and spaced rod holders mounted on a frame and each having an open side, the first of said holders having a top support and the other holder having a bottom support, whereby the rod may be held in said holders with the top side of the rod adjacent the butt bearing against said top support and the bottom of the rod at a point closer to the tip bearing against the bottom support, said apparatus comprising: a shaft journaled in said frame positioned in juxtaposition to said first holder and extending generally normal to and above said rod, a lever attached to said shaft, positioned above said rod and extending generally toward the other holder, said shaft being pivotal from a first position at which said lever extends downwardly toward said rod to a second position at which said lever is above its position when said shaft is in the first position, a roller rotatably mounted on said lever means for rotation about an axis spaced from said shaft and generally normal to said rod, said roller being positioned to bear against the top of said rod adjacent said first holder when said shaft is in the first position to hold the top of the rod spaced from the support of said first holder, whereby a downward pull on the tip of said rod will urge said shaft toward the second position, a second lever attached to said shaft, resilient means connecting said second lever and said frame at a given point on the frame, said point being so positioned with respect to said lever that said resilient means moves over-the-center when said shaft moves between said positions, and a flag attached to said shaft.

References Cited in the file of this patent

UNITED STATES PATENTS

| 374,737 | Geils | Dec. 13, 1887 |
| 2,917,858 | Ikeuchi | Dec. 22, 1959 |
| 2,931,122 | Thordson et al. | Apr. 5, 1960 |

FOREIGN PATENTS

| 804,741 | France | Aug. 10, 1936 |